United States Patent [19]

Takeuchi et al.

[11] Patent Number: 5,327,271
[45] Date of Patent: Jul. 5, 1994

[54] LIQUID CRYSTAL DEVICE EMPLOYING POLYMER NETWORK ON ONE SUBSTRATE AND ALIGNMENT LAYER OR POLYMER NETWORK ON OTHER SUBSTRATE

[75] Inventors: Kiyofumi Takeuchi; Haruyoshi Takatsu, both of Tokyo; Yasuo Umezu, Saitama, all of Japan

[73] Assignee: Dainippon Ink and Chemical, Inc., Tokyo, Japan

[21] Appl. No.: 745,807

[22] Filed: Aug. 16, 1991

[30] Foreign Application Priority Data

| Aug. 17, 1990 | [JP] | Japan | 2-216629 |
| Oct. 8, 1990 | [JP] | Japan | 2-270104 |
| Jan. 10, 1991 | [JP] | Japan | 3-001527 |

[51] Int. Cl.$^5$ .................. G02F 1/1337; G02F 1/13
[52] U.S. Cl. .................. 359/75; 359/78; 359/51; 359/77
[58] Field of Search .......... 359/51, 52, 75, 76, 359/77, 78, 74, 103; 428/1

[56] References Cited

U.S. PATENT DOCUMENTS

| 4,411,495 | 10/1983 | Beni et al. |  |
| 4,435,047 | 3/1984 | Fergason | 428/1 |
| 4,642,532 | 11/1986 | Aftergut et al. | 359/98 |
| 4,664,480 | 5/1987 | Geary et al. | 359/75 |
| 4,842,375 | 6/1989 | Seeboth et al. |  |
| 4,879,059 | 11/1989 | Hanyu et al. | 359/78 X |
| 4,925,708 | 5/1990 | Waters et al. | 428/1 |
| 4,937,013 | 6/1990 | Buckley et al. |  |
| 5,066,105 | 11/1991 | Yoshimoto et al. | 359/58 |
| 5,088,807 | 2/1992 | Waters et al. | 359/94 |
| 5,089,904 | 2/1992 | Fergason | 359/52 |

FOREIGN PATENT DOCUMENTS

| 0313053 | 4/1989 | European Pat. Off. |
| 0313053 | 4/1989 | European Pat. Off. |
| 0321118 | 6/1989 | European Pat. Off. |
| 0451905 | 10/1991 | European Pat. Off. |
| 58-501631 | 9/1983 | Japan |
| 62-02231 | 1/1987 | Japan |
| 63-144321 | 6/1988 | Japan |
| 63-271233 | 11/1988 | Japan |
| 1062615 | 3/1989 | Japan |
| 1198725 | 8/1989 | Japan |
| 8504262 | 9/1985 | World Int. Prop. O. |

*Primary Examiner*—William L. Sikes
*Assistant Examiner*—Kenneth Parker
*Attorney, Agent, or Firm*—Armstrong, Westerman, Hattori, McLeland & Naughton

[57] ABSTRACT

A liquid crystal device comprising a pair of substrates each having an electrode layer at least one of which is transparent, one or both of said substrates having formed thereon a network layer having a three-dimensional network structure which comprises a transparent solid substance, or one of said substrates having formed thereon said network layer with the other substrate having formed thereon an alignment layer, said pair of substrates being assembled in such a manner that said network layer of one substrate faces to the other network layer or the other substrate with or without an alignment layer in contact or with a small gap therebetween, and a liquid crystal material filled between said pair of substrates.

27 Claims, 6 Drawing Sheets

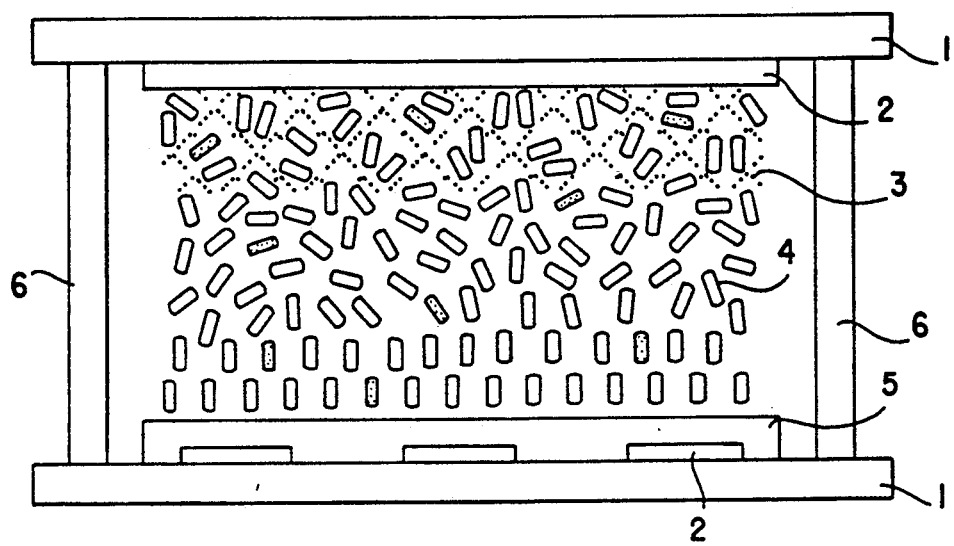
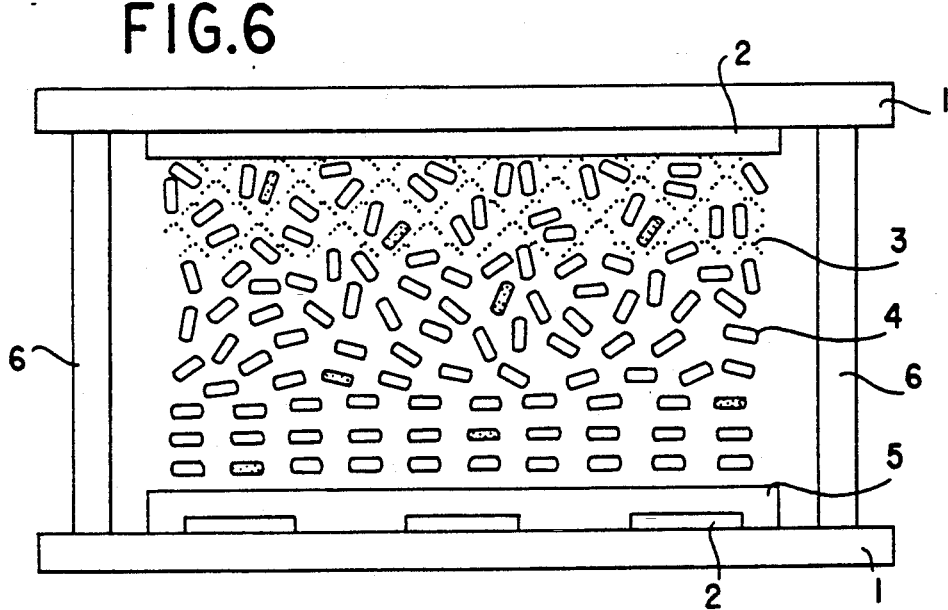

LIQUID CRYSTAL DEVICE EMPLOYING POLYMER NETWORK ON ONE SUBSTRATE AND ALIGNMENT LAYER OR POLYMER NETWORK ON OTHER SUBSTRATE

FIELD OF THE INVENTION

This invention relates to a liquid crystal-containing thin display panel which needs no polarizer and, more particularly, to a liquid crystal display capable of making a color display in which opaqueness (cut-off) and transparency of the view can be electrically controlled. The liquid crystal display of the invention is useful as windows of buildings or display windows for screening the visual field or as displays for character or graphic display through electrical switching at a high rate of response, for example, as information display boards for advertisement and computer terminal displays requiring brightness, and particularly projection displays.

BACKGROUND OF THE INVENTION

Liquid crystal devices for practical use include TN (twisted nematic) or STN (super-twisted nematic) mode displays using nematic liquid crystals. Those utilizing ferroelectric liquid crystals have also been proposed.

These conventional devices require a polarizer and are therefore limited in brightness of the display.

It is known that use of a polymer film having dispersed therein microencapsulated liquid crystals makes it possible to produce large-sized and still inexpensive and high-contrast liquid crystal devices requiring neither a polarizer nor an alignment layer. Encapsulating materials proposed to date include gelatin, gum arabic, polyvinyl alcohol, etc. as disclosed in JP-W-58-501631 (the term "JP-W" as used herein means an "unexamined published International patent application") and as U.S. Pat. No 4,435,047 proposed. Such polymer-dispesed liquid crystal systems also include a dispersion of liquid crystals in an epoxy resin matrix (JP-W-61-502128), a film in which phase separation between liquid crystals and a polymer is fixed on exposure to light (JP-A-61-305528; the term "JP-A" as used herein means an "unexamined published Japanese patent application"), a dispersion of liquid crystals in a special ultraviolet-curing polymer (JP-A-62-2231), and a process for filming a mixture of polyester, liquid crystals, and a solvent (JP-A-63-144321).

However, the liquid crystal devices obtained by the techniques disclosed in JP-W-58-501631, JP-W-61-502128, and JP-A-61-2231 need a high driving voltage of at least 25 V and, in most cases, from 50 to 200 V for obtaining sufficient transparency. Further, the contrast ratio achieved with the liquid crystal devices disclosed in JP-A-61-305528 and JP-A-1-62615 is 10 at the highest and, in most cases, 8 or less, which is below the level required for practical use.

In order to satisfy the above-described characteristics of liquid crystal devices which are important for practical use, i.e., low power driving properties, high contrast, and multiplex driving properties, JP-A-1-198725 discloses a liquid crystal device having such a structure that a liquid crystal material forms a continuous phase in which a polymer forms a three-dimensional network.

On the other hand, it has been proposed to control transmission and absorption of light in liquid crystal color displays by using a guest-host liquid crystal material comprising a dichroic dye having a dichroic ratio of 1 or more and a liquid crystal material having positive dielectric anisotropy as described in G. H. Heilmeir, *Appl. Phys. Lett.*, Vol. 13, p. 91 (1968). This technique has been practically applied to TN or STN mode nematic liquid crystal displays.

The dichroic dyes used in these color displays, though excellent in light and chemical stability, are limited to those having a dichroic ratio of 1 or more, the displays using them are negative displays, composed of a colorless pattern on a colored background, and are therefore poor in visual appreciation. Hence, many attempts to achieve positive displays have hitherto been made. Such attempts include a method of using a liquid crystal having negative dielectric anisotropy and an alignment layer for vertical (homeotropic) alignment of the liquid cystal molecules as disclosed in *IEEE Trans. Elect. Dev.*, ED-26, p. 1373 (1979); a method of using a tetrazine type dichroic dye having a negative dichroic ratio (the dichroic dye was not put into practical use due to its chemical instability) as disclosed in *Mol. Cryst. Liq. Cryst. Lett.*, Vol. 56, p. 115 (1979); and a method utilizing a special technique for obtaining parallel (homogeneous) alignment in the display portion and homeotropic alignment in the non-display portion, i.e., the background, as disclosed in *Mol. Cryst. Liq. Cryst.*, Vol. 74, p. 227 (1981).

However, because any of the devices obtained by these methods still requires a polarizer, capability of obtaining a bright image area was limited as discussed above. In particular, when the device is applied to high-density projection displays, strong back light enough to compensate for a reduction in opening ratio is needed, leading to an increased cost. In addition, a special technique for liquid crystal alignment is required, resulting in a reduction in yield of production of displays.

In connection to the above-described light scattering type liquid crystal color displays as disclosed in JP-W-58-501631, U.S. Pat. No. 4,435,047, JP-W-61-502128, JP-A-61-305528, JP-A-62-2231, and JP-A-63-144321, there have been proposed a display system in which a non-dichroic dye is added to a polymer layer, and a dichroic dye having a dichroic ratio of 1 or more is added to an encapsulated liquid crystal, or dichroic dyes differing in color tone are added to the respective light controlling liquid crystal layers to form a double-layered structure as disclosed in *SID' 86 Digest*, p. 126 (1986); a display system in which a light controlling layer comprising a liquid crystal layer containing a dichroic dye having a dichroic ratio of 1 or more and a colored light-transmitting film are laminated as disclosed in *SID' 90 Digest*, p. 210 (1990); and a display system in which a dichroic dye having a dichroic ratio of 1 or more is added to a liquid crystal material whose dielectric anisotropy changes from positive to negative depending on the driving frequency as disclosed in *SID' 90 Digest*, p. 128 (1990). All the devices obtained by these techniques, however, require a high driving voltage of at least 40 V and have poor steepness in responding as demanded for multiplex driving. Moreover, there is involved such complexity that matching of refractive index between a liquid crystal material and a transparent solid substance must be optimized or that a special liquid crystal material for two-frequency driving must be used.

In addition to the above-mentioned performance requirements, such as low power driving properties, high contrast, multiplexibility, and a bright image, the conventional liquid crystal devices have the following problems.

The devices reveal hysteresis in their electro-optical characteristics, that is, a difference between a transmittance at an increasing voltage and that at a decreasing voltage. As a result, the margin of multiplexing is reduced, giving rise to a problem in making a display with grey scale level. Further, resistivity of liquid crystal devices is reduced by the influences of light, heat, etc. during production of the devices, leading to an increase in power consumption, a reduction in life, and flicker of the displayed image due to insufficient voltage holding ratio. Furthermore, in order to produce liquid crystal devices suited to conditions of use such as a driving voltage and a temperature range, it has been necessary to sufficiently examine optimum conditions of production so as to control compatibility between a liquid crystal material and a polymer, dispersibility or phase separation of a liquid crystal material in a polymer, etc. In other words, a liquid crystal material and a polymer to be combined should be properly selected so as to optimize the electro-optical properties.

Further, the above-mentioned devices using dichroic dyes having a dichroic ratio of 1 or more provide a negative display on voltage application, which comprises a colorless transparent pattern on a background which is colored by light scattering. That is, such devices cannot be applied to projection color displays. When the devices are applied to displays of direct view type, the image area is not distinguished from the background color, making it difficult to obtain a clear hue, and an extra means such as back light must therefore be added.

Furthermore, achievement of a useful positive display requires a choice of a special liquid crystal material and a special alignment technique.

SUMMARY OF THE INVENTION

Accordingly, an object of the present invention is to provide a liquid crystal device which exhibits improved hysteresis, which has a high voltage holding ratio, which can be driven at a low power, and which can be produced without any restriction of conditions dependent on a combination of a liquid crystal material and a monomer or an oligomer.

Another object of the present invention is to provide a liquid crystal device which makes a clear positive display while using a dichroic dye.

The inventors have conducted extensive investigations on the structure of liquid crystal devices utilizing an opaque state (light scattering state) and a transparent state and on combinations of guest-host liquid crystal materials for achieving color display. As a result, they have accomplished the above objects of the present invention thereby to provide a liquid crystal device with which a color display of clear hue suitable for use in computer terminal displays or projection displays requiring a bright screen can be obtained.

The present invention provides a liquid crystal device comprising a pair of substrates each having an electrode layer at least one of which is transparent, one or both of said substrates having formed thereon a network layer having a three dimensional network structure which comprises a transparent solid substance, said pair of substrates being assembled in such a manner that said network layer of one substrate faces to the other network layer or the other substrate in contact or with a small gap therebetween, and a liquid crystal material filled between said pair of substrates.

The present invention also provides a liquid crystal device comprising a pair of substrates having an electrode layer at least one of which is transparent, one of said substrates having formed thereon a network layer having a three-dimensional network structure which comprises a transparent solid substance with the other substrate having formed thereon an alignment layer, said pair of substrates being assembled in such a manner that said network layer faces to said alignment layer in contact or with a small gap therebetween, and a liquid crystal material filled between said pair of substrates.

The liquid crystal devices according to the present invention are characterized by its structure in which the function of giving random orientation to a liquid crystal material supported between a pair of substrates to thereby cause optical scattering and the function of revealing opaqueness and transparency through electrical switching are separately performed by a three-dimensional network layer comprising a transparent solid substance and a liquid crystal material, respectively. Such a structure allows a widened choice in the kind of materials which constitute the liquid crystal device and brings about drastic improvements in characteristics required for liquid crystal devices.

BRIEF DESCRIPTION OF THE DRAWINGS

FIGS. 1 through 9 each illustrate a cross section of the liquid crystal device according to the present invention.

DETAILED DESCRIPTION OF THE INVENTION

Substrates which can be used in the present invention include hard materials such as glass and metals and flexible materials such as synthetic resin films. A pair of substrates are assembled to face to each other with an appropriate gap therebetween. At least one of the substrates should be transparent. The transparent substrate (or substrates) has thereon a uniform network layer having a three-dimensional network structure comprising a transparent solid substance (hereinafter simply referred to as a network layer) so that a liquid crystal layer supported between the pair of substrates and the transparent network layer should be seen from at least one side thereof through the transparent substrate. The terminology "transparent" as used for the substrate and network layer does not always mean perfect transparency as long as the above-mentioned visuality is assured. Where the liquid crystal device is demanded to respond to light transmitted from one side of the device to the other side, both of the two substrates must have proper transparency. An electrode layer, either transparent or opaque depending on the use, is provided on each substrate over the entire surface thereof or locally.

A liquid crystal material is filled between a substrate having an electrode layer and a network layer and the other substrate having thereon an electrode layer or having thereon an electrode layer and a network layer or an alignment layer. A spacer for gap retention may be incorporated between the two substrates as is usual in conventional liquid crystal devices.

In one embodiment of the present invention, the liquid crystal material contains a dichroic dye having a dichroic ratio of less than 1. In this embodiment, the dichroic dye brings about colored opaqueness due to light scattering on random orientation of the liquid crystal material to thereby control transmission characteristics of light having a specific wavelength through electrical switching.

Typical structures composed of a liquid crystal material and a transparent solid substance (network layer) according to the present invention are shown in FIGS. 1 to 8 for illustrative purposes but not for limitation. In these figures, numeral 1 indicates a substrate; 2 a transparent electrode, 3 a transparent solid substance, 4 a liquid crystal material which may contain a dichroic dye having a dichroic ratio of less than 1 or not less than 1, 5 an alignment layer, and 6 a sealant, respectively.

Figure 1:
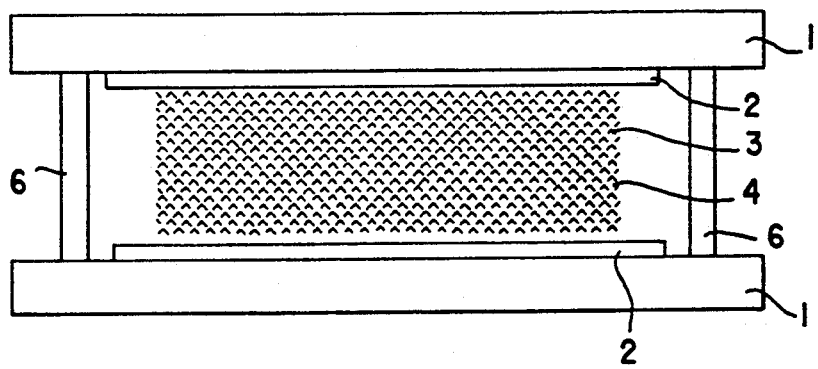

FIG. 1 illustrates a liquid crystal device in which a network layer on one substrate is in contact with an electrode layer of the other substrate.

Figure 2:
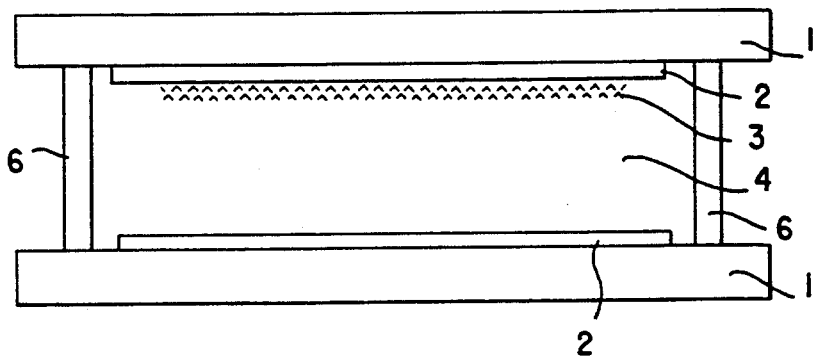

FIG. 2 illustrates a liquid crystal device in which a network layer on one substrate and an electrode layer of the other substrate faces to each other at a given distance therebetween.

Figure 3:
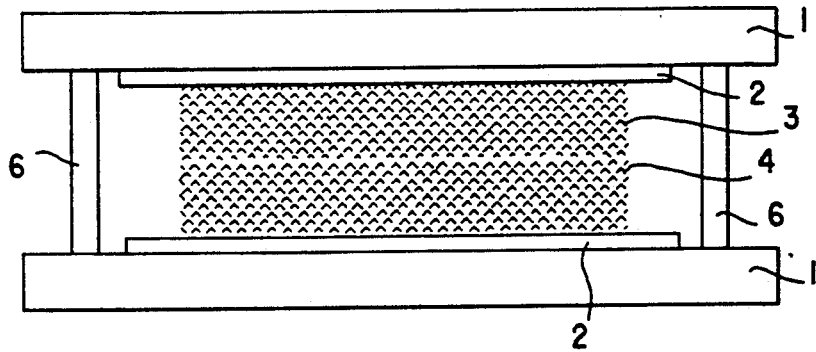

FIG. 3 illustrates a liquid crystal device in which a network layer on one substrate is in contact with a network layer on the other substrate.

Figure 4:
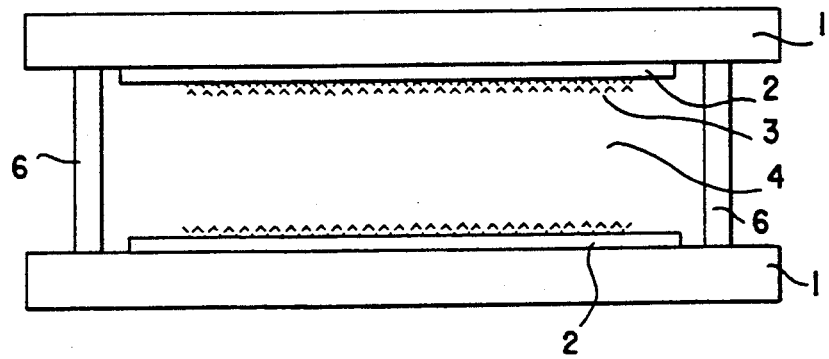

FIG. 4 illustrates a liquid crystal device in which the two network layers as shown in FIG. 3 face to each other at a given distance.

In the devices shown in FIGS. 1 through 4, whether the network layer of one substrate and the electrode layer or network layer of the other substrate are contacting with each other or facing to each other at a given distance, it is essential that they should not be structurally adhered to each other except for sealed parts.

In the above-described structures, a liquid crystal material can be filled between the pair of substrates easily and uniformly without being accompanied with incorporation of air bubbles into the liquid crystal layer Further, a range of choice of materials to be used can be widened without need to consider a difference in coefficient of thermal expansion between the substrate and the three-dimensional network-forming solid substance. The widened choice of materials has an important role in preventing cracking against environmental changes due to thermal cycling particularly in large-sized liquid crystal devices.

FIG. 5 illustrates a liquid crystal device in which a network layer is provided on an electrode layer of one substrate and a homeotropic alignment layer is provided on an electrode layer of the other substrate. The liquid crystal material supported therebetween is orientated at random on the side of the network layer and perpendicular to the side of the homeotropic alignment layer.

FIG. 6 illustrates a liquid crystal device in which a network layer is provided on an electrode layer of one substrate and a homogeneous alignment layer is provided on an electrode layer of the other substrate. The liquid crystal material supported therebetween is orientated at random on the side of the network layer and parallel to the side of the homogeneous alignment layer.

The direction of liquid crystal orientation is not limited to perpendicular or parallel to the substrate and may be the middle of them.

Figure 7:
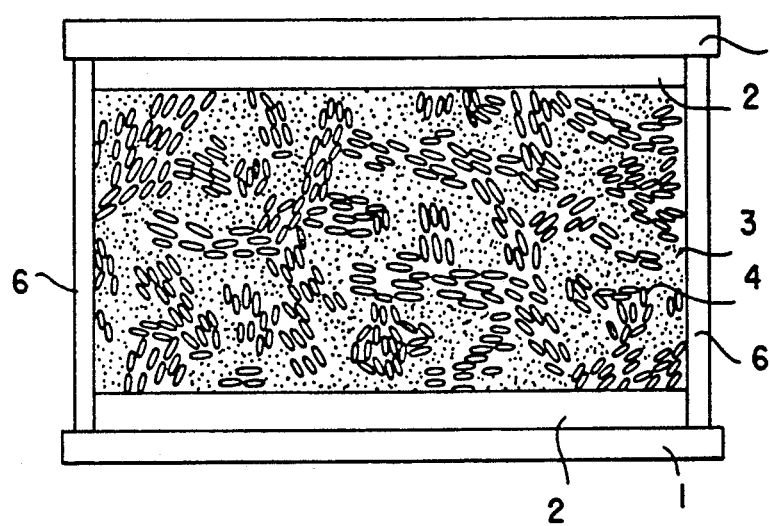

FIG. 7 illustrates a liquid crystal device in which a light controlling layer is supported between a pair of substrates each having an electrode layer, the light controlling layer comprising a transparent solid substance forming a three-dimensional network structure having continuous fine voids in which a liquid crystal material is filled to form a continuous phase.

Figure 8:
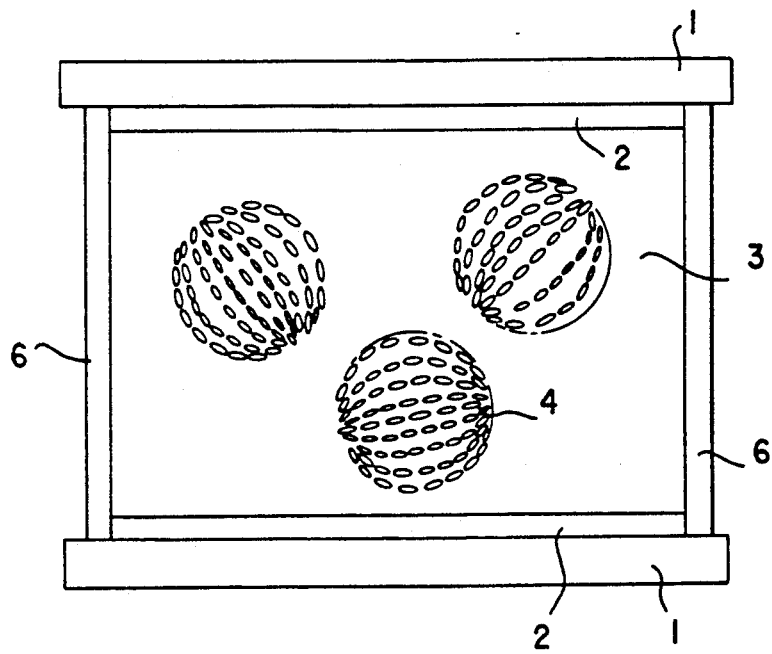

FIG. 8 illustrates a liquid crystal device in which a light controlling layer is supported between a pair of substrates each having an electrode layer, the light controlling layer comprising a transparent solid substance having dispersed therein microcapsules of a liquid crystal material.

Where the liquid crystal device according to the present invention is applied to computer terminal displays or projection displays, active elements (e.g., a thin film transistor, a diode) are preferably provided on the transparent electrode layer.

The liquid crystal material which can be used in the present invention includes not only a single liquid crystal compound but of course a mixture comprising two or more liquid crystal compounds and, if desired, other substances. All the materials recognized as liquid crystal materials in the art can be employed. Among them, those having a positive dielectric anisotropy are preferred. Liquid crystals to be used preferably include nematic liquid crystals, smectic liquid crystals, and cholesteric liquid crystals. For the purpose of improving performance properties, the liquid crystals may contain chiral compounds, e.g., chiral dopants, cholesteric liquid crystals, chiral nematic liquid crystals, and chiral smectic liquid crystals, and dichroic dyes.

More specifically, liquid crystal materials which can be used in the present invention include compositions comprising liquid crystal compounds appropriately selected from among the following compounds taking into consideration desired characteristics, such as isotropic liquid-liquid crystal phase transition temperature, melting point, viscosity, birefringence ($\Delta n$), dielectric anisotropy ($\Delta \epsilon$), and miscibility with a polymerizable composition.

Examples of useful liquid crystal compounds are 4-substituted benzoic acid 4'-substituted phenyl esters, 4-substituted cyclohexanecarboxylic acid 4'-substituted phenyl esters, 4-substituted cyclohexanecarboxylic acid 4'-substituted biphenyl esters, 4-(4-substituted cyclohexanecarbonyloxy)benzoic acid 4'-substituted phenyl esters, 4-(4-substituted cyclohexyl)benzoic acid 4'-substituted phenyl esters, 4-(4-substituted cyclohexyl)benzoic acid 4'-substituted cyclohexyl esters, 4-substituted-4'-substituted biphenyls, 4-substituted phenyl-4'-substituted cyclohexanes, 4-substituted 4''-substituted terphenyls, 4-substituted biphenyl-4'-substituted cyclohexane, and 2-(4-substituted phenyl)-5-substituted pyridines. Preferred of them are those having a cyano group on at least one terminal thereof.

It is preferable that a liquid crystal material is filled in the three-dimensional network structure of the network layer to form a continuous phase. The network layer thus forms a random state of the liquid crystal material to cause light scattering, forming an optical interface.

The transparent solid substance forming the network layer preferably comprises synthetic resins, for example, thermosetting resins or ultraviolet curing resins obtained by polymerization of polymer-forming monomers or oligomers. Synthetic resins soluble in organic solvents or water are also suitable.

Specific examples of the polymer-forming monomers are styrene and derivatives thereof, e.g., chlorostyrene, α-methylstyrene, and divinylbenzene; acrylates, methacrylates or fumarates having a substituent, e.g., methyl, ethyl, propyl, butyl, amyl, 2-ethylhexyl, octyl, nonyl, dodecyl, hexadecyl, octadecyl, cyclohexyl, benzyl, methoxyethyl, butoxyethyl, phenoxyethyl, allyl, methallyl, glycidyl, 2-hydroxyethyl, 2-hydroxypropyl, 3-chloro-2-hydroxypropyl, dimethylaminoethyl, and diethylaminoethyl; poly(meth)acrylate of ethylene glycol, polyethylene glycol, propylene glycol, polypropylene glycol, 1,3-butylene glycol, tetramethylene glycol, hexamethylene glycol, neopentyl glycol, trimethylolpropane, glycerin, or pentaerythritol; vinyl acetate, vinyl benzoate, acrylonitrile, cetyl vinyl ether, limonene, cyclohexene, diallyl phthalate, diallyl isophthalate, 2-, 3-, or 4-vinylpyridine, acrylic acid, methacrylic acid, acrylamide, methacrylamide, N-hydroxymethylacrylamide or N-hydroxyethylmethacrylamide or an alkyl ether thereof; di- or tri(meth)acrylates of triols obtained by addition of 3 or more mols of ethylene oxide or propylene oxide to 1 mol of trimethylolpropane; di(meth)acrylates of diols obtained by addition of 2 or more mols of ethylene oxide or propylene oxide to 1 mol of neopentyl glycol; di(meth)acrylates of diols obtained by addition of 1 or more mols of ethylene oxide or propylene oxide to 1 mol of bisphenol A; a reaction product between 1 mol of 2-hydroxyethyl (meth)acrylate and 1 mol of phenyl isocyanate or n-butyl isocyanate; dipentaerythritol poly(meth)acrylate; poly(meth)acrylate of tris(hydroxyethyl)isocyanuric acid; poly(meth)acrylate of tris(hydroxyethyl)phosphoric acid; di(hydroxyethyl)dicyclopentadiene mono- or di(meth)acrylate; pivalic ester neopentyl glycol diacrylate; caprolactone-modified hydroxypivalic ester neopentyl glycol diacrylate; straight chain aliphatic diacrylates, and polyolefin-modified neopentyl glycol diacrylate. Preferred of them are trimethylolpropane triacrylate, tricyclodecanedimethylol diacrylate, polyethylene glycol diacrylate, polypropylene glycol diacrylate, hexanediol diacrylate, neopentyl glycol diacrylate, and tris(acryloxyethyl)isocyanurate.

Specific examples of the polymer-forming oligomers are epoxy (meth)acrylate and modified products thereof, addition polymerizable compounds in which two or more acryloyloxy groups for example are contained in a terminal isocyanate compound, straight chain polyesters having many pendants of acryloyloxy group and/or methacryloxyloxy group obtained by ring-opening polymerization of dibasic acid anhydride and glycidyl acrylate and/or glycidyl methacrylate, polyacryl (or polymethacryl) modified triazine resins, unsaturated polyester resins, polyester compounds having acryloyloxy group or methacryloyloxy group, diacryl modified (or dimethacryl modified) polyamide compounds.

Polymerization initiators to be used include 2-hydroxy-2-methyl-1-phenylpropan-1-one ("Darocure 1173" produced by Merck Co.), 1-hydroxycyclohexyl phenyl ketone ("Irgacure 184" produced by Ciba Geigy), 1-(4-isopropylphenyl)-2-hydroxy-2-methylpropan-1-one ("Darocure 1116" produced by Merck Co.), benzyl dimethyl ketal ("Irgacure 651" produced by Ciba Geigy), 2'-methyl-1-[4-(methylthio)phenyl]-2-morpholinopropane-1 ("Irgacure 907" produced by Ciba Geigy), a mixture of 2,4-diethylthioxanthone ("Kayacure DETX" produced by Nippon Kayaku Co., Ltd.) and ethyl p-dimethylaminobenzoate ("Kayacure EPA" produced by Nippon Kayaku Co., Ltd.), a mixture of isopropylthioxanthone ("Quantacure ITX" produced by Ward Blenkinsop Co.) and ethyl p-dimethylaminobenzoate, and acylphosphine oxide ("Lucirin TPO" produced by BASF A.G.). From the standpoint of compatibility with a liquid crystal material and a polymer-forming monomer or oligomer, liquid 2-hydroxy-2-methyl-1-phenylpropan-1-one is particularly preferred.

Dichroic dyes which can be used in the present invention for color displays have a dichroic ratio of less than 1 and preferably include anthraquinone dyes which are chemically stable and practically employed. These dichroic dyes were developed and studied by A. V. Ivashchenko, et al. as reported in *Mol. Cryst. Liq. Cryst.*, Vol. 129, pp. 259–283 (1985). Typical chemical structurs of useful dichroic dyes are shown below.

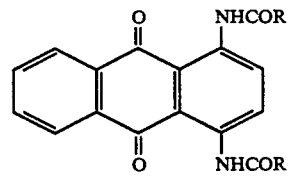

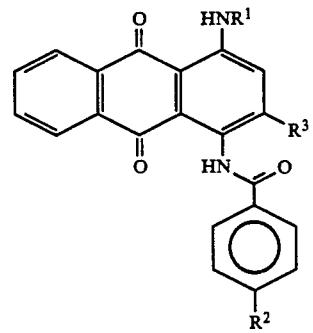

-continued
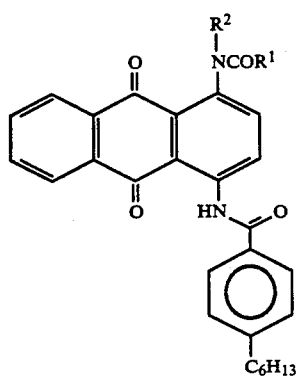
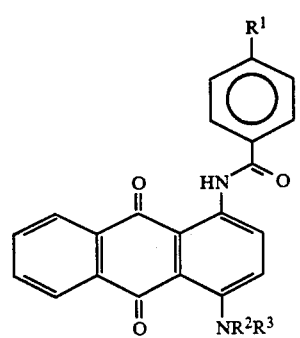
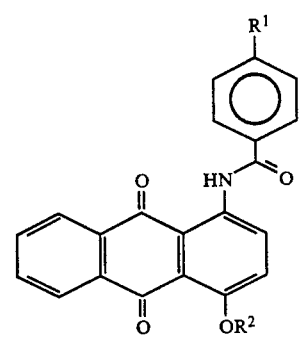
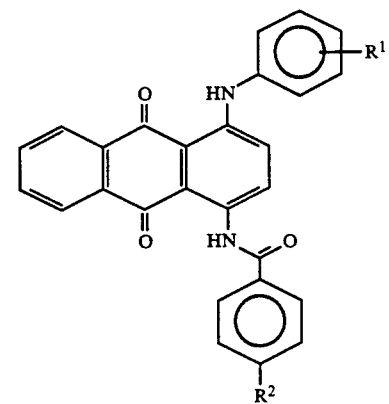

-continued
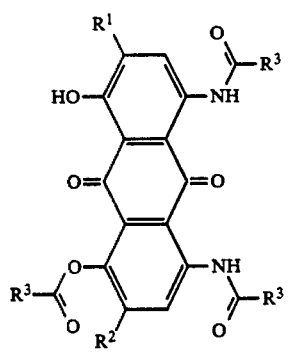
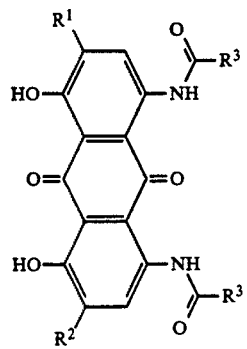
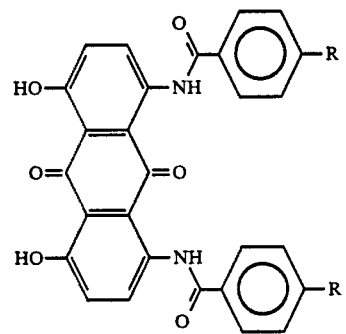
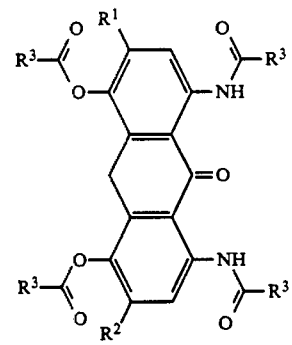
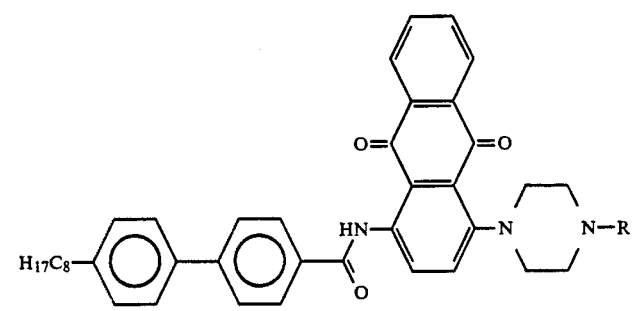

-continued
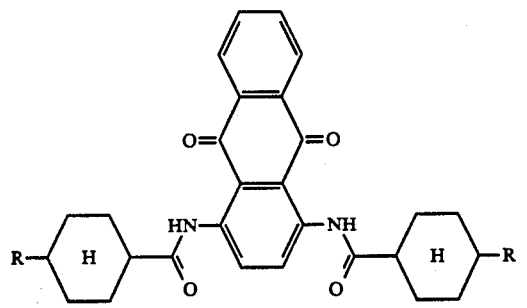
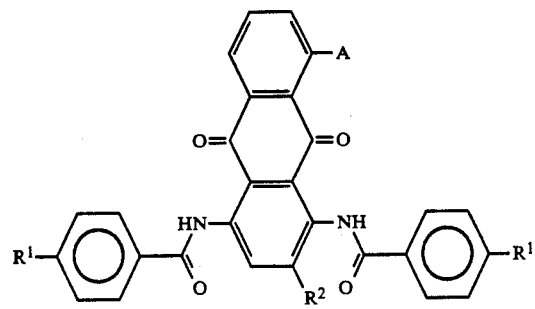
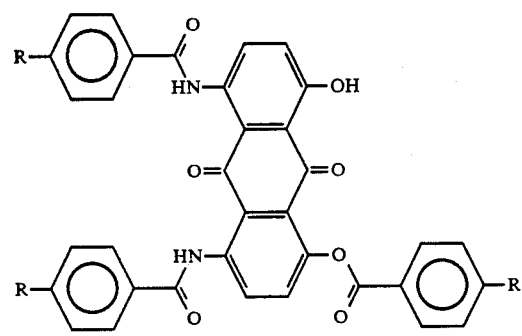
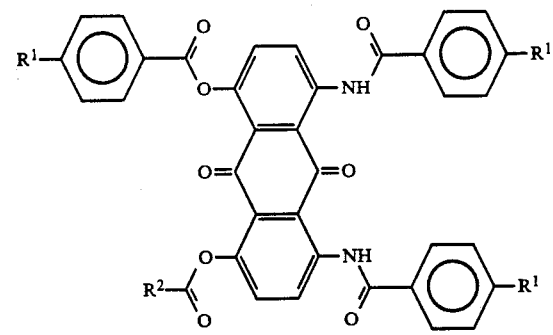
All the above-illustrated dyes have a dichroic ratio of less than 1. Among them, more preferred are those having a dichroic ratio of 0.3 or less for obtaining an image area having a clear hue. Examples of such dichroic dyes are "KD-36", "KD-92", and "DD-266" (all produced by NIOPIK Co.) having the following formulae.
KD-36:

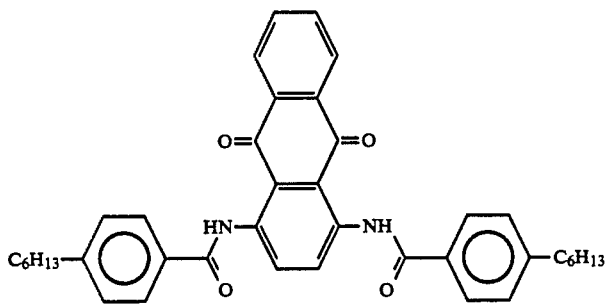

KD-92:

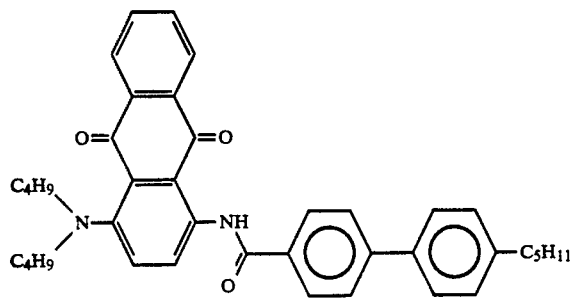

DD-266:

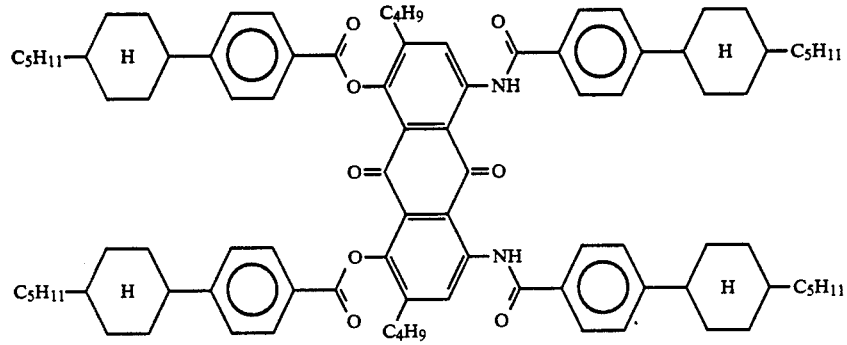

When a liquid crystal material containing the above-described dichroic dyes is used in light scattering liquid crystal devices of direct view type, the image area can hardly been distinguished from the background color manifested by random orientation of the liquid crystal. However, when such a liquid crystal device is used as a transmission display or a projection display, the background becomes black due to light scattering with the image area having a well distinguishable hue to provide a more excellent display as compared with devices using dichroic dyes having a dichroic ratio of 1 or more. Further, where a liquid crystal material containing a dichroic dye having a dichroic ratio of less than 1 in combination with a dichroic dye having a dichroic ratio of 1 or more is used in light scattering liquid crystal devices, the background has a new hue attributed to the mixed dichroic dyes with the image area having a clear hue attributed to the dichroic dye having a dichroic ratio of less than 1 to provide a useful display of direct view type in which at least two distinct hues are electrically controllable.

The network layer as shown in FIGS. 1 through 6 can be formed on a substrate by, for example, inserting a uniform solution comprising (a) a liquid crystal material or a solvent, (b) a polymer-forming monomer or oligomer and, if desired, (c) a photopolymerization initiator into a gap between a pair of substrates at least one of which has a transparent electrode layer and applying ultraviolet light or heat to the inserted solution to cause polymerization curing to form a three-dimensional network structure. The solution may be supported between the substrates by coating the solution on a substrate having a transparent electrode layer with an appropriate coater, e.g., a spin coater, and then superposing an auxiliary plate thereon. Then, one of the two substrates or the auxiliary plate is stripped off, and the thus exposed network layer on the substrate is washed to remove uncured monomer or oligomer and the liquid crystal material or solvent therefrom. The substrate or auxiliary plate to be stripped off may be previously coated with a parting agent to facilitate stripping.

The thickness of the network layer may be controlled by incorporating a spacer into the solution to be inserted or coated or by previously coating a spacer on the substrate.

The network layer may not be hard and may have flexibility, softness or elasticity as long as the purpose be met.

Washing of the network layer can is carried out in the same manner as employed for washing glass substrates with a transparent electrode layer generally used in known liquid crystal devices. Washing may also be effected by ultrasonic cleaning in an organic solvent, pure water, or a fresh solution of a liquid crystal material.

The substrate having thereon the thus washed network layer must be thoroughly dried by vacuum drying, heating in vacuo, or the like means.

Methods for uniformly forming a network layer on a substrate are not limited to the above-mentioned techniques. For example, it is possible to form the three-dimensional network structure by using a polymer solution in place of the polymer-forming monomer or oligomer and removing the solvent or water by evaporation.

The thus formed three-dimensional network structure preferably has an average mesh size ranging from 0.2 to 2 $\mu$m. If the cell dimension is too large or too small for a wavelength of light, light scattering properties tend to be reduced. In order to obtain a contrast sufficient for the end use between opaqueness due to light scattering and transparency induced by electrical switching, the thickness of the network layer preferably ranges from 2 to 15 $\mu$m.

The resulting substrate having thereon a uniform network layer is then paired with another substrate having an electrode layer which may have formed thereon a network layer or a known unidirectional alignment layer according to the following methods (1) to (4) to produce liquid crystal devices of the present invention.

(1) A pair of substrates each having a transparent electrode layer, at least one of which has a network layer on the electrode layer thereof, are faced to each other and adhered with a sealant except for an opening for filling a liquid crystal material to form a unit panel in a usual manner. After evacuating the inside of the panel, the opening of the panel is dipped in a liquid crystal material, and the inner pressure is returned to atmospheric pressure to thereby inject the liquid crystal material into the gap between the substrates.

(2) A liquid crystal material is coated on the substrate having thereon a transparent electrode layer and a network layer. Another substrate having the same structure or having a transparent electrode layer is superposed thereon, followed by thorough degassing in vacuo. Then, the periphery of the two substrates is adhered with a sealant.

(3) A substrate having thereon a transparent electrode layer and a network layer and a substrate having a transparent electrode layer and an alignment layer are paired and adhered with a sealant except for an opening for filling a liquid crystal material to obtain a unit panel in a known manner. After evacuating the inside of the panel, the opening of the panel is dipped in a liquid crystal material, and the pressure is returned to atmospheric pressure to thereby inject the liquid crystal material into the gap between the substrates.

(4) A liquid crystal material is coated on a substrate having thereon a transparent electrode layer and a network layer or a substrate having a transparent electrode layer and a unidirectional alignment layer. The other substrate thereof (i.e., having an alignment layer or a transparent layer) is superposed thereon, followed by thorough degassing in vacuo. Then, the periphery of the two substrates is adhered with a sealant.

In the above-described methods, the gap between the two substrates is preferably from 2 to 30 $\mu$m, and more preferably from 5 to 20 $\mu$m.

The liquid crystal devices shown in FIGS. 7 and 8 can be produced according to the methods disclosed, e.g., in JP-A-1-198725 and JP-W-58-501631, except for using a liquid crystal material containing a dichroic dye having a dichroic ratio of less than 1. In these liquid crystal devices, too, the gap between the two substrates preferably ranges from 5 to 20 $\mu$m.

The thus produced liquid crystal devices can be used for making color displays without any special techniques as required in conventional light scattering liquid crystal devices. In particular, when applied to displays of direct view type or projection type, the devices provide excellent image areas with a distinct hue.

The liquid crystal devices of the present invention in which a light controlling layer comprising a transparent solid substance is provided on at least one of electrode layers have such characteristics: (1) low power driving properties, (2) high voltage holding ratio owing to enhanced resistivity of the liquid crystal material supported, (3) improved hysteresis which leads to display characteristics excellent in gradation, and (4) no restriction on selection of liquid crystal materials and synthetic resins to be combined therewith, which makes it easy to obtain improvements in display characteristics.

The present invention is now illustrated in greater detail with reference to Examples, but it should be understood that the present invention is not deemed to be limited thereto. All the percents are given by weight unless otherwise indicated. Characteristics of the liquid crystal devices obtained in Examples were evaluated with respect to the following items.

1) Line Number in Multiplexing

Line number of multiplexing ($N_{max}$) was obtained from equation:

$$N_{max}=[(\alpha^2+1)/(\alpha^2-1)]^2$$

wherein $\alpha = V_{90}/V_{10}$ (hereinafter defined)

2) Driving Voltage

The transmittance ($T_0$) with no voltage applied was taken as 0%. The transmittance increased with an increase in applied voltage. The highest maximum transmittance ($T_{100}$) was taken as 100%. The applied voltage at which the transmittance reaches 10% or 90% ($V_{10}$ or $V_{90}$, respectively) was determined.

3) Contrast Ratio

In the absence of the device in the photometry system, the transmittance with a light source "on" and that with "off" was taken as 100% and 0%, respectively. A contrast ratio was obtained from $T_{100}/T_0$.

4) Hysteresis

The voltage at which 50% transmittance ($T_{50}$) was obtained at the increasing of applied voltage from 0 V and that at the decreasing of applied voltage from a sufficiently high voltage were taken as $V_{50}^{up}$ and $V_{50}^{down}$. Voltage vs. transmittance hysteresis was evaluated by the value $\Delta V = V_{50}^{up} - V_{50}^{down}$.

5) Switching Time

The power source was switched on to a certain voltage, and the rise time ($\tau_r$) required for the transmittance to reach 90% was determined. Then, the power source was switched off to 0 V, and the decay time ($\tau_d$) required for the transmittance to fall to 10% was determined. The voltage in the on-state was varied, and the switching time where $\tau_r$ was equal to $\tau_d$ was obtained.

6) Voltage Holding Ratio

A square wave of 4.5 V having a flame frequency of 60 Hz and an on-state duration of 67 μsec was applied. The charge quantity accumulated during the on-state was taken as $Q_0$. The current which was leaked during the off-state was measured with a high impedance voltmeter to obtain a residual charge quantity (Q). A voltage holding ratio (%) was calculated from $Q/Q_0 \times 100$.

EXAMPLE 1

A solution consisting of 19.8% of a polymer-forming oligomer "HX-620" (caprolactone-modified hydroxypivalic acid ester neopentyl glycol diacrylate produced by Nippon Kayaku Co., Ltd.), 0.2% of 2-hydroxy-2-methyl-1-phenylpropan-1-one as a polymerization initiator, and 80% of liquid crystal material (A) having the following composition was filled between a 5 cm × 5 cm glass plate having an ITO transparent electrode layer on which a small amount of a spacer having an average particle size of 10 μm had been scattered and a polycarbonate plate ("Jupiron" produced by Mitsubishi Gas Chemical Ind., Ltd.) of the same size as the ITO glass plate. The resulting unit panel was passed under a metal halide lamp (80 W/cm$^2$) with the ITO glass plate upside at a speed of 3.5 m/min to irradiate ultraviolet light at a dose corresponding to 500 mJ/cm$^2$ on the liquid material to cure the polymer-forming oligomer. Observation of the section of the cured product (network layer) under a scanning electron microscope revealed a three-dimensional network structure comprising a transparent solid substance.

The polycarbonate plate was stripped off, and the thus exposed network layer uniformly formed on the ITO glass substrate was subjected to ultrasonic cleaning in ethanol, followed by heat drying in vacuo.

The ITO glass plate having uniformly formed thereon the network layer and an ITO glass plate of the same size were assembled to face to each other and adhered with a sealant "DSA-001" (epoxy resin produced by Rodic Co.) to prepare a cell having an opening The cell was placed in vacuo, the opening of the cell was dipped in liquid crystal material (B) shown below, and the pressure was returned to atmospheric pressure to obtain a liquid crystal device.

The resulting liquid crystal device had the following characteristics.

$V_{10}$: 5.1 V
$V_{90}$: 9.7 V
α: 1.9
$N_{max}$: 3.1
Contrast ratio: 1:19
$\tau_r = \tau_d$: 20.3 msec
Hysteresis: 0.2 V
Voltage holding ratio: 64.1%

Composition of Liquid Crystal Material (A):

n-C$_3$H$_7$—[H]—COO—[◯]—OC$_2$H$_5$   33.4% n-C$_4$H$_9$—[H]—COO—[◯]—OC$_2$H$_5$   33.3% n-C$_5$H$_{11}$—[H]—COO—[◯]—OCH$_3$   33.3%

Composition of Liquid Crystal Material (B):

C$_2$H$_5$—[◯N]—[◯]—CN   25% n-C$_3$H$_7$—[◯N]—[◯]—CN   30% n-C$_5$H$_{11}$—[◯N]—[◯]—CN   30% n-C$_5$H$_{11}$—[◯]—[◯N]—[◯]—CN   15%

Phase transition temperature: 68.5° C. (N⇌I)
< −25° C. (C⇌N)
Refractive index: $n_e$ = 1.787
$n_o$ = 1.533
Δn = 0.254
Dielectric permittivity: $\epsilon_\parallel$ = 37.8
$\epsilon_\perp$ = 10.9
Δε = 26.9

EXAMPLE 2

A liquid crystal device was produced in the same manner as in Example 1, except for replacing the polycarbonate plate with a transparent film "T-COAT PA-75" (produced by Teijin Limited).

The resulting device had the following characteristics.

$V_{10}$: 5.4 V
$V_{90}$: 10.2 V
α: 1.89
$N_{max}$: 3.2
Contrast ratio: 1:19
$\tau_r = \tau_d$: 21.2 msec
Hysteresis: 0.2 V
Voltage holding ratio: 64.2%

EXAMPLE 3

A liquid crystal device was produced in the same manner as in Example 1, except for replacing the polycarbonate plate with a glass plate on which a silicone type water repellant (produced by Shin-Etsu Chemical Co.) had been coated.

The resulting device had the following characteristics.

$V_{10}$: 5.3 V
$V_{90}$: 10.0 V
α: 1.89
$N_{max}$: 3.2
Contrast ratio: 1:19
$\tau_r = \tau_d$: 20.8 msec
Hysteresis: 0.2 V
Voltage holding ratio: 64.0%

EXAMPLE 4

A liquid crystal device was produced in the same manner as in Example 1, except for replacing liquid crystal material (B) with liquid crystal material (C) having the following composition.

The resulting device had the following characteristics.

$V_{10}$: 5.9 V
$V_{90}$: 11.3 V
α: 1.92
$N_{max}$: 3.0
Contrast ratio: 1:18
$\tau_r = \tau_d$: 22.5 msec
Hysteresis: 0.15 V
Voltage holding ratio: 67.3%

Composition of Liquid Crystal Material (C):

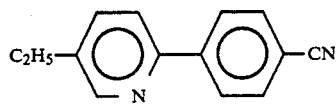  20%

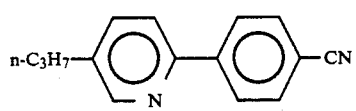  20%

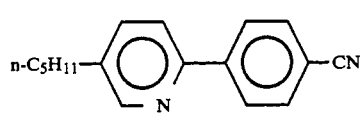  25%

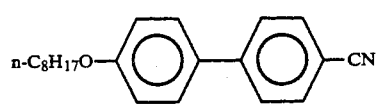  15%

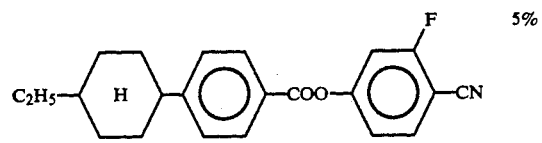  5%

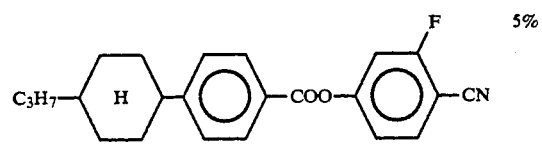  5%

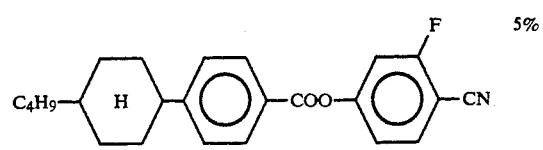  5%

-continued

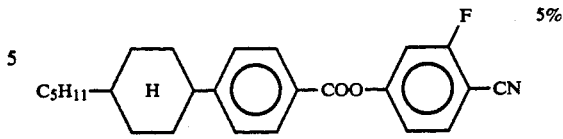  5%

Phase transition temperature: 72.1° C. (N⇌I)
                               <-25° C. (C⇌N)
Refractive index: $n_e = 1.759$
                 $n_o = 1.525$
                 $\Delta n = 0.234$
Dielectric permittivity: $\epsilon_{\parallel} = 37.2$
                      $\epsilon_{\perp} = 9.4$
                      $\Delta\epsilon = 27.8$

EXAMPLE 5

A liquid crystal device was produced in the same manner as in Example 1, except for replacing liquid crystal material (B) with liquid crystal material (D) having the following composition.

The resulting device had the following characteristics.

$V_{10}$: 6.3 V
$V_{90}$: 12.2 V
α: 1.94
$N_{max}$: 3.0
Contrast ratio: 1:18
$\tau_r = \tau_d$: 20.0 msec
Hysteresis: 0.2 V
Voltage holding ratio: 69.6%

Composition of Liquid Crystal Material (D):

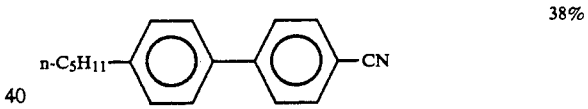  38%

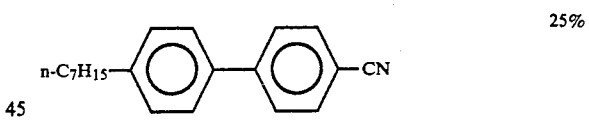  25%

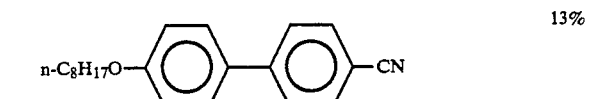  13%

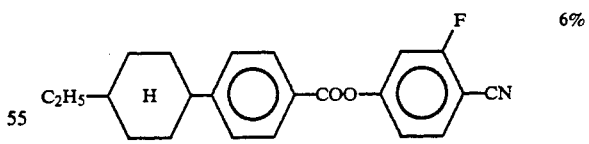  6%

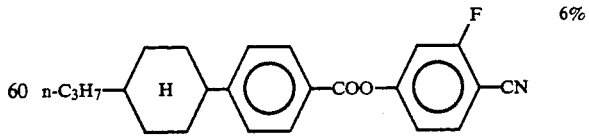  6%

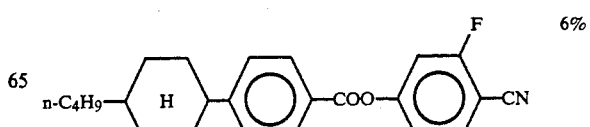  6% n-C5H11—[H]—[⌬]—COO—[⌬(F)]—CN  6%

Phase transition temperature: 69.9° C. (N⇌I)
 <-25° C. (C⇌N)
Refractive index: $n_e = 1.721$
 $n_o = 1.512$
 $\Delta n = 0.209$
Dielectric permittivity: $\epsilon_\parallel = 24.0$
 $\epsilon_\perp = 6.0$
 $\Delta\epsilon = 18.0$

EXAMPLE 6

A liquid crystal device was produced in the same manner as in Example 1, except for replacing liquid crystal material (B) with liquid crystal material (E) having the following composition.

The resulting device had the following characteristics.

$V_{10}$: 6.6 V
$V_{90}$: 13.0 V
$\alpha$: 1.97
$N_{max}$: 2.9
Contrast ratio: 1:17
$\tau_4 = \tau_d$: 19.8 msec
Hysteresis: 0.2 V
Voltage holding ratio: 71.0%

Composition of Liquid Crystal Material (E):

n-C5H11—[⌬]—[⌬]—CN  43% n-C3H7O—[⌬]—[⌬]—CN  17% n-C5H11O—[⌬]—[⌬]—CN  13% n-C8H17O—[⌬]—[⌬]—CN  17% n-C5H11—[⌬]—[⌬]—[⌬]—CN  10%

Phase transition temperature: 70.8° C. (N⇌I)
 -10° C. (C⇌N)
Refractive index: $n_e = 1.767$
 $n_o = 1.525$
 $\Delta n = 0.242$
Dielectric permittivity: $\epsilon_\parallel = 21.7$
 $\epsilon_\perp = 5.8$
 $\Delta\epsilon = 15.9$

EXAMPLE 7

A solution consisting of 24.8% of a polymer-forming oligomer "HX-620", 0.2% of 2-hydroxy-2-methyl-1-phenylpropan-1-one as a polymerization initiator, and 75% of ethanol as an organic solvent was filled between a 5 cm×5 cm ITO glass plate on which a small amount of a spacer having an average particle size of 4 μm had been scattered and a polycarbonate plate "Jupiron" of the same size as the ITO glass plate. Ultraviolet light was irradiated on the resulting unit panel under the same conditions as in Example 1 from the ITO glass plate side to cure the polymer-forming oligomer. Observation of the section of the cured product (network layer) under a scanning electron microscope revealed a three-dimensional network structure comprising a transparent solid substance.

The polycarbonate plate was stripped off, and the thus exposed network layer uniformly formed on the ITO glass substrate was subjected to ultrasonic cleaning in ethanol, followed by heat drying in vacuo.

Two of the resulting ITO glass plates having uniformly formed thereon the network layer were assembled to face to each other and fixed together with a sealant "DSA-001" to prepare a cell having an opening. The cell was placed in vacuo, the opening of the cell was dipped in liquid crystal material (C), and the pressure was returned to atmospheric pressure to obtain a liquid crystal device.

The resulting liquid crystal device had the following characteristics.

$V_{10}$: 3.8 V
$V_{90}$: 7.4 V
$\alpha$: 1.94
$N_{max}$: 3.0
Contrast ratio: 1:15
$\tau_r = \tau_d$: 22.3 msec
Hysteresis: 0.05 V
Voltage holding ratio: 68.9%

EXAMPLE 8

A liquid crystal device was produced in the same manner as in Example 7, except for replacing liquid crystal material (C) with liquid crystal material (E).

The resulting device had the following characteristics.

$V_{10}$: 3.9 V
$V_{90}$: 7.7 V
$\alpha$: 1.97
$N_{max}$: 2.9
Contrast ratio: 1:15
$\tau_r = \tau_d$: 24.0 msec
Hysteresis: 0.1 V
Voltage holding ratio: 73.3%

EXAMPLE 9

A solution consisting of 19.8% of a polymer-forming oligomer "HX-620", 0.2% of 2-hydroxy-2-methyl-1-phenylpropan-1-one as a polymerization initiator, and 80% of liquid crystal material (B) was filled between a 5 cm×5 cm ITO glass plate on which a small amount of a spacer having an average particle size of 7 μm had been scattered and a 3.5×3.5 cm polycarbonate plate "Jupiron". Ultraviolet light was irradiated on the resulting unit panel under the same conditions as in Example 1 from the ITO glass plate side to cure the polymer-forming oligomer. Observation of the section of the cured product (network layer) under a scanning electron microscope revealed a three-dimensional network structure comprising a transparent solid substance.

The polycarbonate plate was stripped off, and the thus exposed network layer uniformly formed on the ITO glass substrate was subjected to ultrasonic cleaning in ethanol, followed by heat drying in vacuo.

A mixture of a small amount of a spacer having an average particle size of 20 μm and a sealant "DSA001" was screen-printed on the resulting ITO glass plate having uniformly formed thereon the network layer, and another ITO glass plate having uniformly formed thereon the network layer was superposed thereon with a gap of 20 μm to prepare a cell having an opening. The cell was placed in vacuo, the opening of the cell was dipped in a mixture comprising 98% of liquid crystal material (B) and 2% of a black dichroic dye "S-416" (produced by Mitsui Toatsu Chemicals Ind.), and the pressure was returned to atmospheric pressure to obtain a liquid crystal device.

The resulting liquid crystal device had the following characteristics.

$V_{10}$: 5.2 V
$V_{90}$: 9.8 V
$\alpha$: 1.89
$N_{max}$: 3.2
Contrast ratio: 1:82
$\tau_r = \tau_d$: 21.5 msec
Hysteresis: 0.15 V
Voltage holding ratio: 63.0%

COMPARATIVE EXAMPLE 1

A mixture consisting of 19.8% of a polymer-forming oligomer "HX-620", 0.2% of 2-hydroxy-2-methyl-1-phenylpropan-1-one as a polymerization initiator, and 80% of liquid crystal material (B) was mixed with a small amount of a spacer having an average particle size of 10 μm. The resulting mixture was filled between a pair of 5 cm×5 cm ITO glass plates and irradiatd with ultraviolet light under the same conditions as in Example 1 to cure the polymer-forming oligomer to form a light controlling layer comprising a continuous liquid crystal phase containing a transparent solid substance. Observation of the section of the light controlling layer under a scanning electron microscope revealed a three-dimensional network structure comprising a transparent solid substance.

The resulting liquid crystal device had the following characteristics.

$V_{10}$: 6.9 V
$V_{90}$: 12.8 V
$\alpha$: 1.88
$N_{max}$: 3.2
Contrast ratio: 1:19
$\tau_r = \tau_D$: 19.8 msec
Hysteresis: 0.9 V
Voltage holding ratio: 21.0%

COMPARATIVE EXAMPLE 2

A liquid crystal device was produced in the same manner as in Comparative Example 1, except for replacing liquid crystal material (B) with liquid crystal material (E).

The resulting device had the following characteristics.

$V_{10}$: 20.0 V
$V_{90}$: 40.2 V
$\alpha$: 2.01
$N_{max}$: 2.7
Contrast ratio: 1:15
$\tau_r = \tau_d$: 20.1 msec
Hysteresis: 2.3 V
Voltage holding ratio: 25.5%

COMPARATIVE EXAMPLE 3

A mixture consisting of 19% of a polymer-forming oligomer "HX-620", 1% of 2-hydroxy-2-methyl-1-phenylpropan-1-one as a polymerization initiator, 78.4% of liquid crystal material (B), and 1.6% of a black dichroic dye "S-416" was mixed with a small amount of a spacer having an average particle size of 10 μm. The resulting mixture was filled between a pair of 5 cm×5 cm ITO glass plates and irradiated with ultraviolet light under the same conditions as in Example 1. However, the polymer-forming oligomer did not cure, failing to provide a liquid crystal device having a light scattering layer.

Comparisons of hysteresis values and voltage holding ratio between the liquid crystal devices obtained in the foregoing Examples and those obtained in Comparative Examples 1 and 2 apparently prove that the liquid crystal devices according to the present invention exhibit markedly improved hysteresis and voltage holding without impairing electro-optical characteristics.

Further, comparison between Example 9 and Comparative Example 3 proves that the liquid crystal devices according to the present invention can easily be produced so as to meet the end purpose without receiving any restrictions on selection of liquid crystal materials combined with polymer forming materials.

EXAMPLE 10

An ITO glass plate having uniformly formed thereon a network layer was prepared in the same manner as in Example 1. The ITO glass with a network layer was paired with an ITO glass plate of the same size on which a homeotropic alignment layer comprising lecithin had been formed in a known manner, and the pair of substrates were adhered with a sealant "DSA-001" to prepare a cell having an opening. The cell was placed in vacuo, the opening of the cell was dipped in liquid crystal material (B), and the pressure was returned to atmospheric pressure to obtain a liquid crystal device.

The resulting liquid crystal device had the following characteristics.

$V_{10}$: 2.4 V
$V_{90}$: 3.2 V
$\alpha$: 1.3
$N_{max}$: 12.7
Contrast ratio: 1:10
$\tau_r = \tau_d$: 23 msec
Hysteresis: 0.1 V
Voltage holding ratio: 65.0%

EXAMPLE 11

A liquid crystal device was produced in the same manner as in Example 10, except for replacing the ITO glass plate having a homeotropic alignment layer with an ITO glass plate of the same size having thereon a homogeneous alignment layer which was prepared by rubbing a polyimide film in a known manner.

The resulting liquid crystal device had the following characteristics.

$V_{10}$: 3.2 V
$V_{90}$: 4.5 V
$\alpha$: 1.4
$N_{max}$: 9.3

Contrast ratio: 1:16
$\tau_r = \tau_d$: 26 msec
Hysteresis: 0.1 V
Voltage holding ratio: 65.0%

EXAMPLE 12

A mixture consisting of 19.8% of a polymer-forming oligomer "HX-620", 0.2% of 2-hydroxy-2-methyl-1-phenylpropan-1-one as a polymerization initiator, and 80% of liquid crystal material (B) was filled between a 5 cm×5 cm ITO glass plate on which a small amount of a spacer having an average particle size of 4 μm had been scattered and a 3.5×3.5 cm polycarbonate plate "Jupiron". Ultraviolet light was irradiated on the resulting unit panel from the ITO glass plate side under the same conditions as in Example 1 to cure the high polymer-forming oligomer. Observation of the section of the cured product (network layer) under a scanning electron microscope revealed a three-dimensional network structure comprising a transparent solid substance.

The polycarbonate plate was stripped off, and the thus exposed network layer uniformly formed on the ITO glass substrate was subjected to ultrasonic cleaning in ethanol, followed by heat drying in vacuo.

A mixture of a small amount of a spacer having an average particle size of 10 μm and a sealant "DSA-001" was screen printed on the resulting ITO glass plate having uniformly formed thereon the network layer, and an ITO glass plate of the same size having thereon a homogeneous alignment layer which was prepared by rubbing a polyimide film in a known manner was superposed thereon with a gap of 10 μm to prepare a cell having an opening. The cell was placed in vacuo, the opening of the cell was dipped in a mixture of 98% of liquid crystal material (B) and 2% of a black dichroic dye "S-416" having a dichroic ratio of 12.6, and the pressure was returned to atmospheric pressure to obtain a liquid crystal device.

The resulting liquid crystal device had the following characteristics.

$V_{10}$: 3.6 V
$V_{90}$: 5.5 V
$a$: 1.52
$N_{max}$: 6.3
Contrast ratio: 1:420
$\tau_r = \tau_d$: 20.3 msec
Hysteresis: 0.10 V
Voltage holding ratio: 64.0%

COMPARATIVE EXAMPLE 4

The same procedures as in Comparative Example 3 were repeated, except for reducing the average particle size of the spacer from 10 μm to 4 μm. However, the polymer-forming oligomer did not cure on ultraviolet irradiation, failing to produce a liquid crystal device having a light scattering layer.

Comparisons between the liquid crystal devices obtained in the foregoing Examples and that obtained in Comparative Example 1 in terms of $V_{10}$, $V_{90}$, hysteresis, and voltage holding clearly demonstrate that the liquid crystal devices according to the present invention can be driven at a lower voltage and have greatly improved hysteresis and voltage holding.

Further, comparison between the liquid crystal device of Example 12 and that obtained in Comparative Example 4 proves that the devices according to the present invention can easily be produced so as to meet the end purpose without receiving any restrictions on selection of liquid crystal materials combined with polymer forming materials.

EXAMPLE 13

A liquid crystal device was produced in the same manner as in Example 1, except for replacing liquid crystal material (B) with a mixture comprising 90% of liquid crystal material (B) and 10% of a dichroic dye having a dichroic ratio of 0.22 "DD-208" ($\lambda_{max}$=467 nm; hue: orange, produced by NIOPIK Co.).

The resulting liquid crystal device had the following characteristics.

$V_{10}$: 5.0 V
$V_{90}$: 8.3 V
$a$: 1.7
$N_{max}$: 4.5
Contrast ratio: 1:45
$\tau_r = \tau_d$: 20.4 msec
Hysteresis: 0.1 V
Voltage holding ratio: 63.8%

When the liquid crystal device obtained was projected on a screen by use of a halogen lamp, the background was black (transmission: 0.1% or less), and the image area was clear orange (transmission: 48%).

EXAMPLE 14

A liquid crystal device was produced in the same manner as in Example 1, except for replacing liquid crystal material (B) with a mixture comprising 88.5% of liquid crystal material (B), 10% of a dichroic dye having a dichroic ratio of 0.09 "DD-266" ($\lambda_{max}$=645 nm; orange hue, produced by NIOPIK Co.), and 1.5% of a dichroic dye having a dichroic ratio of 7.0 "CLD-506" (produced by Sumitomo Chemical Co., Ltd.).

The resulting liquid crystal device had the following characteristics.

$V_{10}$: 5.2 V
$V_{90}$: 8.1 V
$a$: 1.56
$N_{max}$: 5.8
Contrast ratio: 1:47
$\tau_r = \tau_d$: 20.8 msec
Hysteresis: 0.05 V
Voltage holding ratio: 63.9%

When the liquid crystal device obtained was directly seen on the background of a white scattering plate, the background looked green, and the image area looked orange, exhibiting excellent visuality.

EXAMPLE 15

A liquid crystal device was produced in the same manner as in Example 1, except for replacing liquid crystal material (B) with a mixed liquid crystal material comprising 94.5% of liquid crystal material (B), 1% of a dichroic dye having a dichroic ratio of 0.14 "DD-335" ($\lambda_{max}$=335 nm; blue hue, produced by NIOPIK CO.), 0.5% Of a dichroic dye having a dichroic ratio of 0.29 "KD-92" ($\lambda_{max}$=578 nm; blue hue, produced by NI-OPIK Co.), 0.5% Of a dichroic dye having a dichroic ratio of 0.35 "KD-54" ($\lambda_{max}$=577 nm; blue hue, produced by NIOPIK Co.), 0.5% of a dichroic dye having a dichroic ratio of 0.16 "DD-290" ($\lambda_{max}$=540 nm; purple hue, produced by NIOPIK Co.), 0.5% of a dichroic dye having a dichroic ratio of 0.14 "KD-261" ($\lambda_{max}$=540 nm; red hue, produced by NIOPIK Co.), 0.5% of a dichroic dye having a dichroic ratio of 0.24 "DD-327" ($\lambda_{max}$=508 nm; red hue, produced by NI- OPIK Co.), and 2% of a dichroic dye having a dichroic ratio of 0.09 "DD-266" ($\lambda_{max}$=466 nm; orange hue).

The resulting liquid crystal device had the following characteristics.

$V_{10}$: 5.5 V
$V_{90}$: 8.0 V
α: 1.45
$N_{max}$: 7.8
Contrast ratio: 1:283
$\tau_r \tau_d$: 21.0 msec
Hysteresis: 0.03 V
Voltage holding ratio: 60.5%

When the liquid crystal device obtained was directly seen on the background of a white scattering plate, the background was gray, and the image area was clear black, exhibiting excellent visuality.

EXAMPLE 16

An ITO glass plate having uniformly formed thereon a network layer was prepared in the same manner as in Example 1.

The ITO glass with a network layer thereon was assembled with an ITO glass plate of the same size having formed thereon a homeotropic alignment layer comprising lecithin and adhered with a sealant "DSA-001" to prepare a cell having an opening. The cell was placed in vacuo, the opening of the cell was dipped in a mixed liquid crystal material comprising 88% of liquid crystal material (B), 10% of a dichroic dye having a dichroic ratio of 0.22 "DD-208" ($\lambda_{max}$=467 nm; orange hue), and 2% of a dichroic dye having a dichroic ratio of 12.6 "S-416" (black hue; produced by Mitsui Toatsu Senryo K.K.), and the pressure was returned to atmospheric pressure to obtain a liquid crystal device.

The resulting liquid crystal device had the following characteristics.

$V_{10}$: 2.6 V
$V_{90}$: 3.1 V
α: 1.19
$N_{max}$: 33.0
Contrast ratio: 1:138
$\tau_r = \tau_d$: 25 msec
Hysteresis: 0.03 V
Voltage holding ratio: 62.0%

When the liquid crystal device obtained was projected on a screen by use of a halogen lamp, the background had a black hue (transmission: 0.1% or less), and the image area had a clear orange hue (transmission: 41%). Further, when the liquid crystal device was directly seen on the background of a white scatter plate, the background had a black hue, and the image area had a clear orange hue, proving excellent in visuality.

EXAMPLE 17

The following experiment was conducted to demonstrate the effects brought about by the small gap formed between a network layer on one substrate and the surface of the other substrate or a network layer formed on the other substrate.

Figure 9:
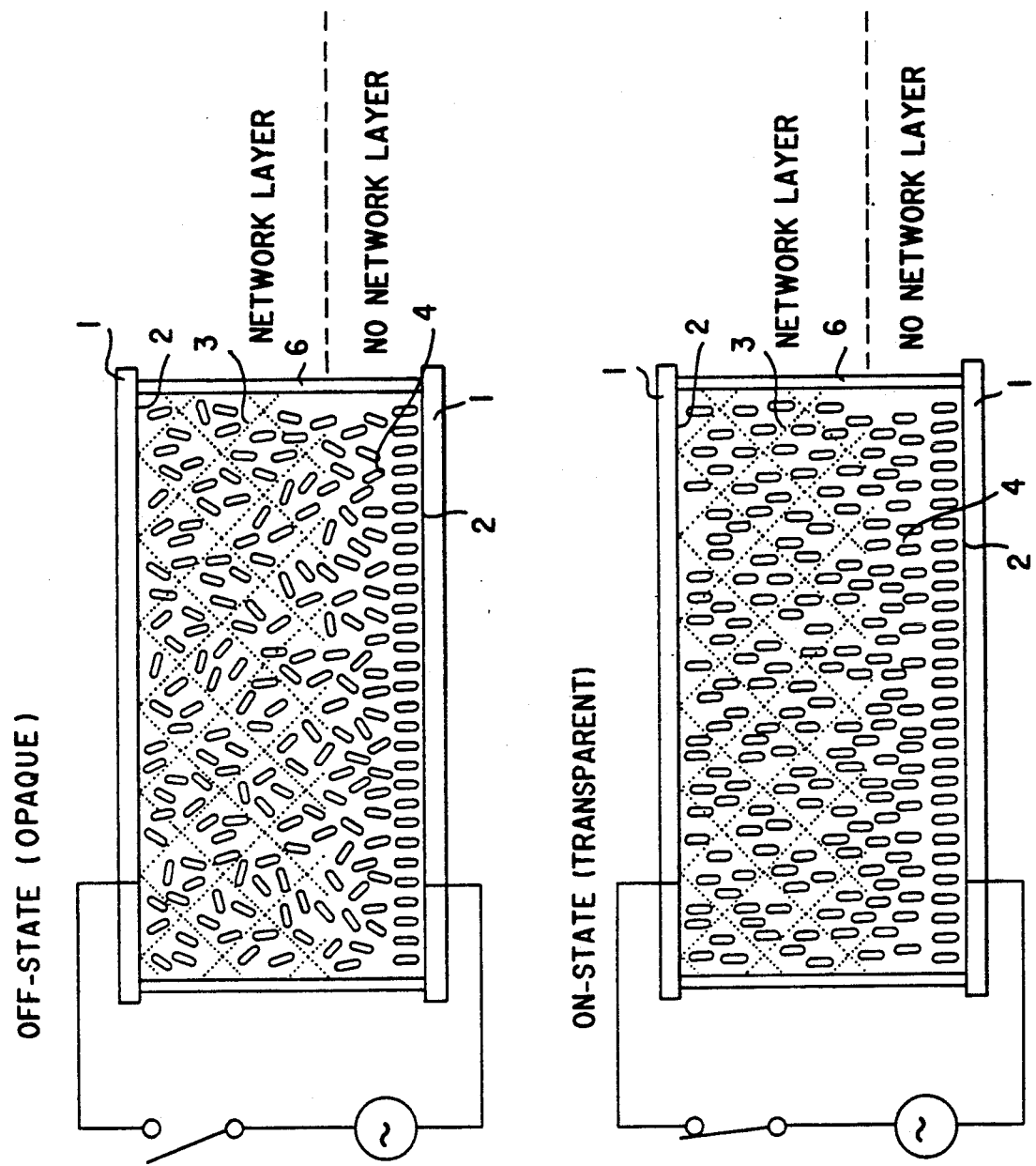

FIG. 9 illustrates a cross-section of a liquid crystal device in which substrate (1) having thereon transparent electrode layer (2) and network layer (3) and substrate (1) having thereon transparent electrode layer (2) and alignment layer which causes homeotropic alignment of liquid crystal molecules are assembled with a small gap (called non-network layer) between the network layer and the alignment layer. The upper figure shows the device in an off-state (opaque), the lower figure an on-state (transparent). In the device, the distance ($d_0$) between the surface of the electrode layer on one substrate and the alignment layer of the other substrate is expressed by the sum of the thickness (d) of network layer (3) and the thickness (d') of the non-network layer ($d_0 = d + d'$).

Liquid crystal devices having the structure of FIG. 9 were produced while fixing $d_0$ at 10 μm and varying d', and $V_{10}$, $V_{90}$, $T_0$, and $T_{100}$ were measured. The results of the measurements are shown in FIGS. 10 and 11.

Figure 10:
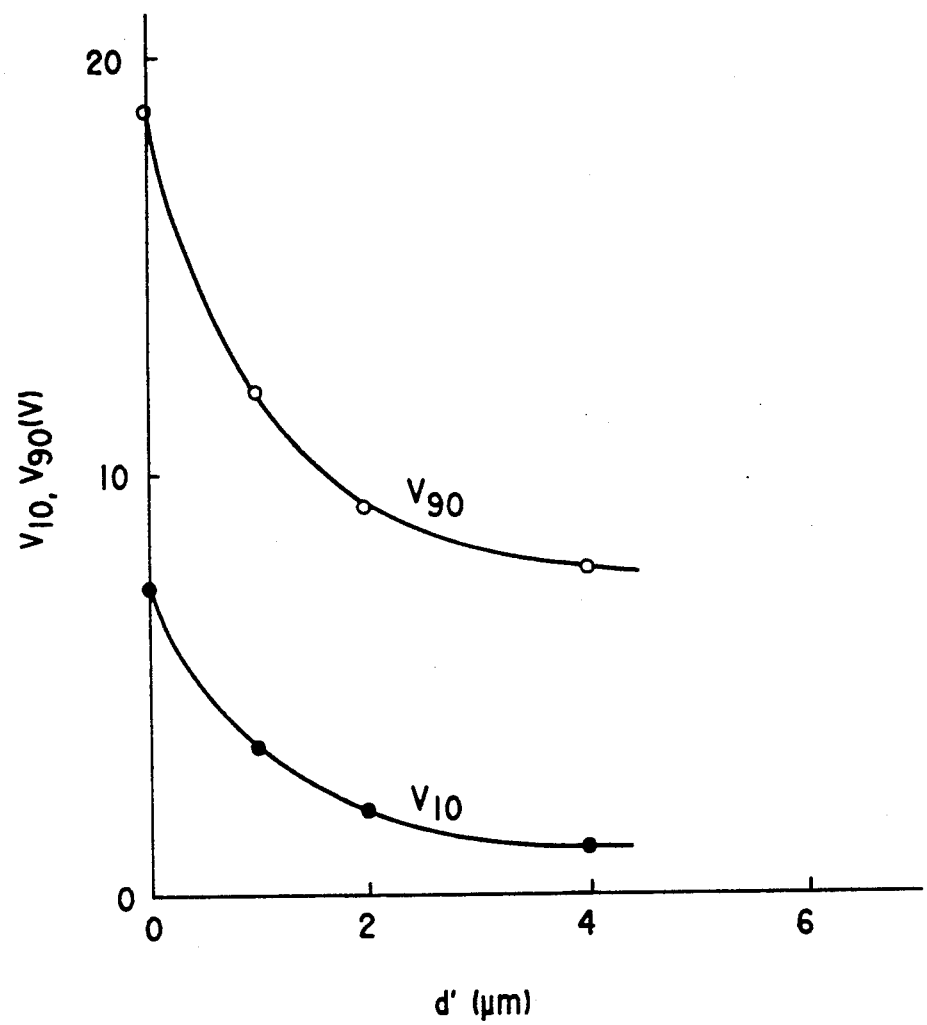
FIG. 10 shows plots of driving voltage vs. non-network layer thickness.
Figure 11:
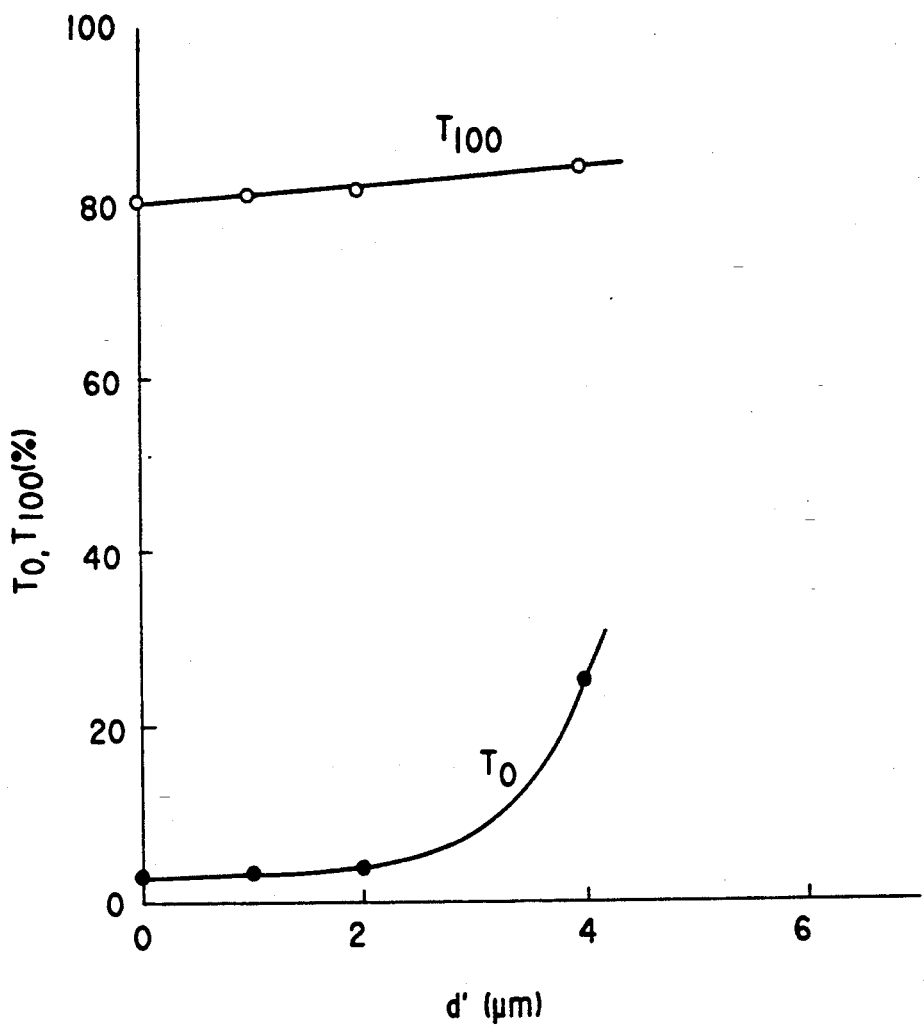
FIG. 11 shows plots of transmittance vs. non-network layer thickness.

FIG. 10 shows that $V_{10}$ and $V_{90}$ drastically decrease according as the thickness of the non-network layer (d') increases. FIG. 11 shows that $T_{100}$ is substantially unchangeable with an increase in d' and that $T_0$ is substantially unchangeable either with d' ranging from 0 to 3 μm. It is apparent from these results that the presence of the non-network layer produces excellent effects to make it feasible to drive the liquid crystal device at a reduced voltage while retaining a satisfactory contrast ratio equal to that of conventional liquid crystal devices.

As described and demonstrated above, the liquid crystal devices according to the present invention provide a clear image without the aid of a polarizer, give a high transparency-opaqueness contrast ratio of about 1:10 to about 1:420, and exhibit threshold characteristics and steep switching characteristics which make multiplex driving feasible. In particular, the liquid crystal devices of the invention reveal an improvement on the hysteresis phenomenon which has been a hindrance with conventional light scattering type liquid crystal devices and a marked improvement in resistivity of the device during its production which leads to achievement of a high voltage holding ratio.

The anthraquinone type dichroic dyes having a dichroic ratio of less than 1 which are used in the present invention for color displays are chemically stable and have high resistivity equal to host liquid crystal materials. The liquid crystal devices of the present invention using such dichroic dyes also exhibit sufficient threshold characteristics and steep switching characteristics for achieving multiplex driving and therefore provide images of clear hue.

Accordingly, the liquid crystal devices of the invention are useful as display elements in computer terminal displays and projection displays.

While the invention has been described in detail and with reference to specific examples thereof, it will be apparent to one skilled in the art that various changes and modifications can be made therein without departing from the spirit and scope thereof.

What is claimed is:

1. A liquid crystal device comprising a pair of substrates, each substrate having an electrode layer and at least one of the substrates being transparent, each of said substrates having formed thereon a network layer having a three-dimensional network structure having continuous fine voids which comprises a transparent solid substance, and a liquid crystal material filled between said pair of substrates and filling said voids in the network structure.

2. A liquid crystal device as claimed in claim 1, wherein one of said pair of substrates has an active element selected from a thin film transistor or a diode.

3. A liquid crystal device as claimed in claim 1, wherein said transparent solid substance is a synthetic resin.

4. A liquid crystal device as claimed in claim 1, wherein said network layer has a thickness of from 2 to 15 μm.

5. A liquid crystal device as claimed in claim 1, wherein said liquid crystal material contains a dichroic dye having a dichroic ratio of less than 1.

6. A liquid crystal device as claimed in claim 5, wherein said dichroic dye is an anthraquinone dye.

7. A liquid crystal device as claimed in claim 1, wherein said liquid crystal material contains a dichroic dye having a dichroic ratio of 1 or more.

8. A liquid crystal device comprising a pair of substrates, each substrate having an electrode layer and at least one of the substrates being transparent, one or both of said substrates having formed thereon a network layer having a three-dimensional network structure having continuous fine voids which comprises a transparent solid substance, said pair of substrates being assembled in such a manner that said network layer of one substrate faces to the other network layer or the other substrate with a small gap therebetween, and a liquid crystal material filled between said pair of substrates and filling said voids in the network structure.

9. A liquid crystal device as claimed in claim 8, wherein one of said pair of substrates has an active element selected from the thin film transistor or a diode.

10. A liquid crystal device as claimed in claim 8, wherein said transparent solid substance is a synthetic resin.

11. A liquid crystal device as claimed in claim 8, wherein said network layer has a thickness of from 2 to 15 μm.

12. A liquid crystal device as claimed in claim 8, wherein said liquid crystal material contains a dichroic dye having a dichroic ratio of less than 1.

13. A liquid crystal device as claimed in claim 13, wherein said dichroic dye is an anthraquinone dye.

14. A liquid crystal device as claimed in claim 8, wherein said liquid crystal material contains a dichroic dye having a dichroic ratio of 1 or more.

15. A liquid crystal device comprising a pair of substrates, each substrate having an electrode layer and at least one of the substrates being transparent, one of said substrates having formed thereon a network layer having a three-dimensional network structure having continuous fine voids which comprises a transparent solid substance with the other substrate having formed thereon an alignment layer, said pair of substrates being assembled in such a manner that said network layer faces to said alignment layer in contact or with a small gap therebetween, and a liquid crystal material filled between said pair of substrates and filling said voids in the network structure.

16. A liquid crystal devices as claimed in claim 15, wherein said alignment layer comprises polyimide.

17. A liquid crystal devices as claimed in claim 15, wherein said alignment layer is a homeotropic alignment layer.

18. A liquid crystal devices as claimed in claim 15, wherein said alignment layer is a homogeneous alignment layer.

19. A liquid crystal devices as claimed in claim 15, wherein one of said pair of substrates has an active element selected from a thin film transistor or a diode.

20. A liquid crystal devices as claimed in claim 15, wherein said transparent solid substance is a synthetic resin.

21. A liquid crystal devices as claimed in claim 15, wherein said network layer has a thickness of from 2 to 15 μm.

22. A liquid crystal devices as claimed in claim 15, wherein said liquid crystal material contains a dichroic dye having a dichroic ratio of less than 1.

23. A liquid crystal devices as claimed in claim 22, wherein said dichroic dye is an anthraquinone dye.

24. A liquid crystal devices as claimed in claim 15, wherein said liquid crystal material contains a dichroic dye having a dichroic ratio of 1 or more.

25. A liquid crystal display having, as a transmission display or a projection display, a liquid crystal device comprising a pair of substrates, each substrate having an electrode layer and at least one of the substrates being transparent, both of said substrates having formed thereon a network layer having a three-dimensional network structure having continuous fine voids which comprises a transparent solid structure, and a liquid crystal material filled between said pair of substrates and filling said voids in the network structure.

26. A liquid crystal display having, as a transmission display or a projection display, a liquid crystal device comprising a pair of substrates, each substrate having an electrode layer and at least one of the substrates being transparent, one or both of said substrates having formed thereon a network layer having a three-dimensional network structure having continuous fine voids which comprises a transparent solid substance, said pair of substrates being assembled in such a manner that said network layer of one substrate faces to the other network layer or the other substrate with a small gap therebetween, and a liquid crystal material filled between said pair of substrates and filling said voids in the network structure.

27. A liquid crystal display having, as a transmission display or a projection display, a liquid crystal device comprising a pair of substrates each having an electrode layer and at least one of the substrates being transparent, one of said substrates having formed thereon a network layer having a three-dimensional network structure having continuous fine voids which comprises a transparent solid substance with the other substrate having formed thereon an alignment layer, said pair of substrates being assembled in such a manner that said network layer faces to said alignment layer in contact or with a small gap therebetween, and a liquid crystal material filled between said pair of substrates and filling said voids in the network structure.

* * * * *